United States Patent [19]

Ajioka et al.

[11] Patent Number: 4,634,448
[45] Date of Patent: Jan. 6, 1987

[54] METHOD FOR DYEING OF NATURAL LEATHERS USING REACTIVE DYES

[75] Inventors: Syohei Ajioka, Ina; Toshio Tanaka, Higashiyamato, both of Japan

[73] Assignee: Nippon Kayaku Kabushiki Kaisha, Tokyo, Japan

[21] Appl. No.: 763,783

[22] Filed: Aug. 8, 1985

[30] Foreign Application Priority Data

Aug. 20, 1984 [JP] Japan .................. 59-171521

[51] Int. Cl.⁴ .................. D06P 3/32; D06P 1/38
[52] U.S. Cl. .................. 8/436; 8/437; 8/547; 8/673; 8/688
[58] Field of Search .................. 8/436, 547

[56] References Cited

U.S. PATENT DOCUMENTS

| | | | |
|---|---|---|---|
| 3,211,513 | 10/1965 | Ulrich et al. | 8/547 |
| 3,347,617 | 10/1967 | Ulrich et al. | 8/436 |
| 3,519,614 | 7/1970 | Ponzini | 8/543 |
| 3,556,708 | 1/1971 | Randall | 8/547 |
| 4,453,945 | 6/1984 | Miyamoto et al. | 8/532 |

OTHER PUBLICATIONS

E. Siegel in Venkataraman's, "The Chemistry of Synthetic Dyes", vol. VI, (Academic Press), 1972, pp. 149–152.

J. F. Feeman in Venkataraman's, "The Chemistry of Synthetic Dyes", vol. VIII, (Academic Press), 1978, pp. 74–77.

Primary Examiner—A. Lionel Clingman
Attorney, Agent, or Firm—Cushman, Darby & Cushman

[57] ABSTRACT

Disclosed herein is a method for dyeing of natural leathers by using a reactive dyestuff having at least one S-triazinyl group to which a substituent group having a quaternary nitrogen atom is bonded via the quaternary nitrogen atom without using any acid-binder, any substance releasing the acid-binder or any inorganic electrolyte, thereby obtaining the dyed natural leathers excellent in light fastness, alkaline-sweat and wet fastness.

3 Claims, No Drawings

METHOD FOR DYEING OF NATURAL LEATHERS USING REACTIVE DYES

BACKGROUND OF THE INVENTION

The present invention relates to a method for dyeing of natural leathers.

At present, natural leather materials are mainly dyed by acid dyestuffs, direct dyestuffs, basic dyestuffs, etc., however, the thus dyed leathers are not sufficient in alkaline fastness, wet fastness, etc., and a method for dyeing by using reactive dyestuffs has been also tried.

In the case of dyeing the natural leather materials with ordinary reactive dyestuffs having the reactive group(s) such as a monochlorotriazinyl group, a dichlorotriazinyl group, a monofluorotriazinyl group, a vinylsulfonyl group and the like, the acid-binder which is necessary for causing the reactive dyestuff to dye the leather material, or the substance which releases the acid-binder by heating, etc., for instance, sodium carbonate, potassium carbonate, sodium hydroxide, potassium hydroxide, sodium metasilicate, trisodium phosphate, tripotassium phosphate, potassium pyrophosphate, sodium pyrophosphate, sodium hydrogencarbonate, sodium trichloroacetate and the like spoils the physical properties (the strength, the touch, etc.) of the natural leather material therefore a method for dyeing of the natural leather materials with ordinary reactive dyestuffs did not carried out commercially. Moreover, in the case of dyeing the natural leathers by acid dyestuffs, direct dyestuffs or basic dyestuffs, a use of a large amount of inorganic electrolytes such as sodium chloride, sodium sulfate and the like is required, and such an inorganic electrolyte not only gives detrimental effects on the physical properties of the leather but also the use thereof is not economically profitable.

Accordingly, the development of a method for obtaining the dyed natural leather which are excellent in fastness, particularly in light fastness, alkaline-sweat fastness, and wet fastness by using a dyestuff not using any acid-binder which spoils the physical properties of natural leather, any substance which releases an acid-binder by heating, etc. nor any inorganic electrolyte which is economically unprofitable has been eagerly required.

As a result of the present inventors' studies for finding a dyeing method which may give excellent dyed natural leather without using any acid-binder or any substance which releases the acid-binder nor any inorganic electrolyte, the present invention has been attained.

SUMMARY OF THE INVENTION

In an aspect of the present invention, there is provided a method for dyeing natural leathers, comprising dyeing the natural leather by an exhaustion method using a reactive dyestuff having at least one S-triazinyl group to which a substituent group having a quaternary nitrogen atom is bonded via the quaternary nitrogen atom in an aqueous dye bath.

DETAILED DESCRIPTION OF THE INVENTION

The present invention relates to a method for dyeing natural leather materials by an exhaustion method using a reactive dyestuff having at least one S-triazinyl group to which a substituent group having a quaternary nitrogen atom is bonded via the nitrogen atom in an aqueous dye bath.

As the substituent group having a quaternary nitrogen atom

according to the present invention, the following groups may be mentioned.

(1) A quaternary pyridinium group is represented by the formula (I):

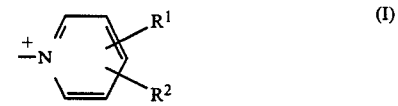

wherein $R^1$ and $R^2$ represent independently a hydrogen atom, a chlorine atom, a bromine atom, a methyl group, a sulfo group, a carboxyl group, a carbamoyl group, an alkoxy ($C_1 \sim C_4$) carbonyl group and a cyano group, and the concrete instances of the formula (I) may be mentioned as follows.

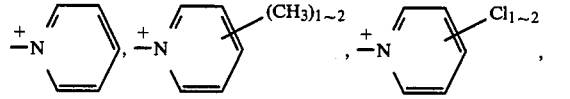

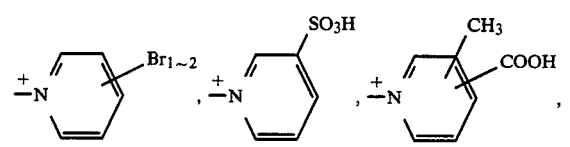

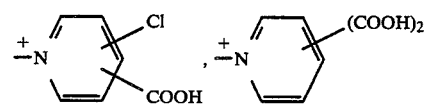

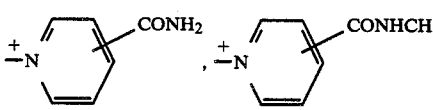

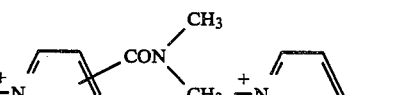

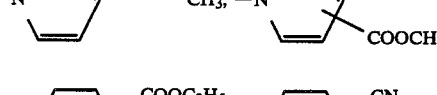

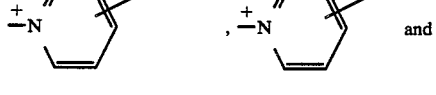

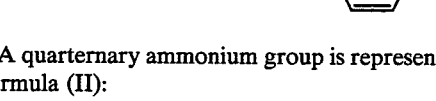

(2) A quaternary ammonium group is represented by the formula (II):

(II)

wherein $R^3$, $R^4$ and $R^5$ independently represent an alkyl ($C_1 \sim C_4$) group, a hydroxyalkyl ($C_1 \sim C_4$) group, a benzyl group, a sulfoalkyl ($C_1 \sim C_4$) group, a carboxyalkyl ($C_1 \sim C_4$) group and an alkoxy ($C_1 \sim C_4$) alkyl ($C_1 \sim C_4$) group, and the concrete instances of the formula (II) may be mentioned as follows.

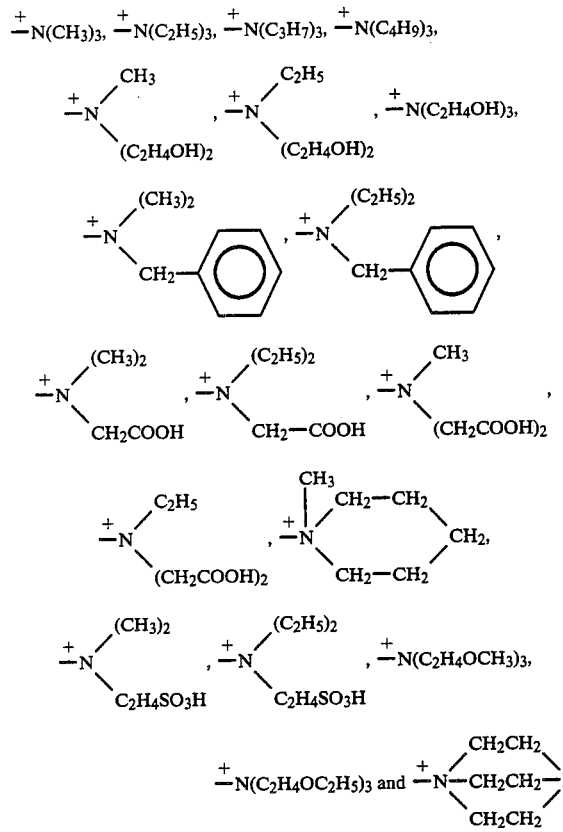

In the present invention, the reactive dyestuffs having at least one S-triazinyl group to which a substituent group having a quarternary nitrogen atom is bonded via the nitrogen atom(s) are represented by the following formulae.

(1) The dyestuffs represented by the formula (III):

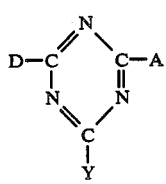
(III)

wherein Y represents a group

;

D represents a chromophore having at least one water-soluble group, and D is bonded to the triazinyl group via a group

wherein R is a hydrogen atom or a $C_1$ to $C_3$ alkyl group, and A represents an unsubstituted or substituted amino group, an alkoxy group or a phenoxy group, which does not react with the chromophore.

(2) The dyestuffs represented by the formula (IV):

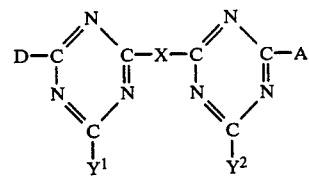
(IV)

wherein both $Y^1$ and $Y^2$ are the group

or one of $Y^1$ and $Y^2$ is the group

and the other of $Y^1$ and $Y^2$ represents a chlorine atom, a fluorine atom or a bromine atom; X represents a diamino residual group bonded to the triazinyl group via the two amino groups (—NH—) and D and A are as defined above.

(3) The dyestuffs represented by the formula (V):

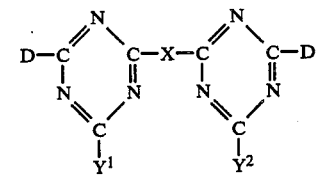
(V)

wherein D, X, $Y^1$ and $Y^2$ are as defined above.

(4) The dyestuffs represented by the formula (VI):

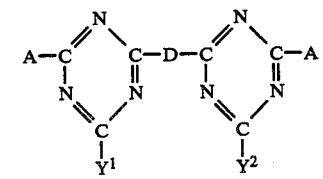
(VI)

wherein D, A, $Y^1$ and $Y^2$ are as defined above.

As the chromophore represented by D in the formulae (III) to (VI), for instance, those chromophores such as azo dyestuffs, metal-containing azo dyestuffs, formazane dyestuffs, phthalocyanine dyestuffs, anthraquinone dyestuffs, etc. may be mentioned and they have at least one water-soluble group such as a sulfo group of a carboxyl group.

As the unsubstituted or substituted amino group, alkoxy ($C_1 \sim C_4$) group or phenoxy group which does not react with the dyestuff, and is represented by A, for instance, the following groups may be mentioned:

an amino group, alkylamino groups such as a methylamino group, an ethylamino group, a propylamino group, a butylamino group, a dimethylamino group, a diethylamino group, an N-methyl, N-ethyl amino group, an octylamino group and a cyclohexylamino group, hydroxyalkylamino groups such as a monoethanolamino group and a diethanolamino group, cyanoalkylamino groups such as a β-cyanoethylamino group, and a di-β-cyanoethylamino group, a β-sulfoethylamino group, —NHC₂H₄SO₃H, —NHCH₂COOH, an anilino group, anilino groups substituted by a chlorine atom, a sulfo group, a lower alkyl group, a lower alkoxy group a nitro group or a carboxyl group such as an o-, m- or p-sulfoanilino group, a 2,5-disulfoanilino group, an o-, m- or p-toluidino group, an o-, m- or p-methoxyanilino group, an o-, m- or p-chloroanilino group, a 2-methyl-4-sulfoanilino group, a 2-methoxy-4-sulfoanilino group, a p-nitroanilino group, a 2-sulfo-4-methylanilino group, a 4-chloro-2-sulfoanilino group, an o-, m- or p-carboxyanilino group and a 2-carboxy-4-sulfoanilino group, an N-methylanilino group, an N-ethyl-4-chloroanilino group, alkoxy groups such as a methoxy group, an ethoxy group, a propoxy group and a butoxy group, alkoxyalkoxy groups such as a methoxyethoxy group, an ethoxyethoxy group and a methoxypropoxy group, a phenoxy group, substituted phenoxy groups by a chlorine atom, a nitro group, a methyl group, a sulfo group, a carboxyl group and the like such as an o-, m- or p-chlorophenoxy group, an o-, m- or p-nitrophenoxy group, an o-, m- or p-sulfophenoxy group and an o-, m- or p-carboxyphenoxy group, a morpholino group, a piperidino group and a piperadino group.

As the diamino residual group represented by X, for instance, the following groups may be mentioned:

alkylenediamino groups such as an ethylenediamino group, a 1,3-propylenediamino group, a 1,6-hexylenediamino group, a 2-hydroxy-1,3-propylenediamino group and —NHCH₂CH₂OCH₂CH₂NH—, arylenediamino groups such as a 1,4-phenylenediamino group, a 1-methyl-2,6-phenylenediamino group, a 1,3-phenylenediamono group, a 4-sulfo-1,3-phenylenediamono group, a 4,6-disulfo-1,3-phenylenediamino group, a 2-sulfo-1,4-phenylenediamino group, a 2,5-disulfo-1,4-phenylenediamino group, a 5-carboxy-1,3-phenylenediamino group, a 2,5-dimethoxy-1,4-phenylenediamino group, a 1-N-methylaminoanilino group, a 1,2-phenylenediamino group, a 2,4,6-trimethyl-5-sulfo-1,4-phenylenediamino group,

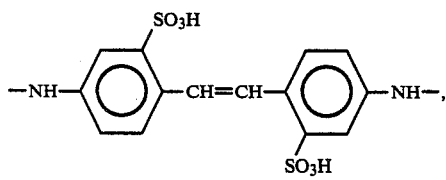

a 2-methyl-5-sulfo-1,3-phenylenediamino group, a 4-methyl-1,2-phenylenediamino group,

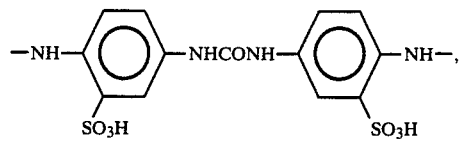

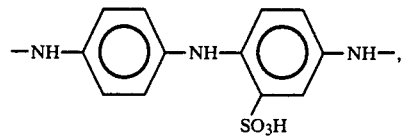

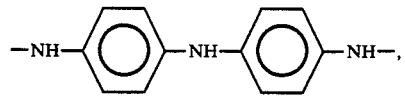

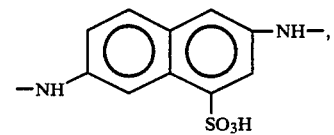

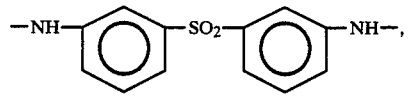

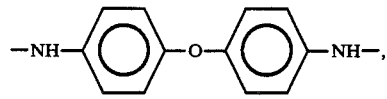

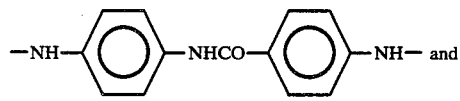 and

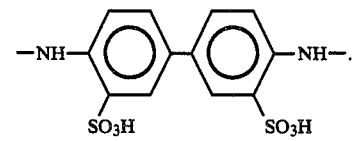

The reactive dyestuff represented by the formulae (III) to (VI) can be produced byreacting a precursor represented by the formulae (III) to (VI) wherein Y, $Y^1$ and $Y^2$ are chlorine atoms, bromine atoms or fluorine atoms respectively with a tertiary amine or an alkali metal salt thereof, preferably in an aqueous solution of pH of from 5 to 9 at a temperature of from 45° to 110° C.

The natural leathers which are used according to the present invention are animal leathers, which are easily available for ornamental uses and clothing uses, and as the concrete instances thereof pigskin, calfskin, cow- and oxskin, horsehide, sheepskin, reptile-skin may be mentioned.

Although it is most desirable to use a leather tanned by chrome salts (chrome tanning) in the method according to the present invention, it is possible to use rawhide before subjecting to chrome tanning or leather tanned by tannin.

Various methods may be adopted in the case of carrying out the dyeing of the natural leather according to the present invention, however, an exhaustion dyeing method is desirable.

In the case of carrying out the exhaustion dyeing method, a chrome-tanned leather is dyed as follows.

A leather subjected to tanning by the use of sodium bichromate, etc. is treated in warm water, if chrome salts remain in the chrome-tanned leather, in warm water containing sodium bicarbonate, sodium formate, ammonia, etc., thereby subjecting to neutralization of the tanned leather. Then, the thus treated leather is dyed in the bath wherein neutralization were carried out or in an another bath.

Namely, the leather is at first treated in an aqueous dye bath containing the reactive dyestuff having at least one S-triazinyl group to which a substituent group having a quaternary nitrogen atom is bonded via the quaternary nitrogen atom for from 20 to 60 min at a temperature of from 20° to 40° C., thereby penetrating the dyestuff into the inner part of the leather. This step is so-called penetration of dyestuff.

Then, the thus treated leather is dyed for 20 to 60 min at a somewhat higher temperature than that of "penetration of a dyestuff" step, i.e. from 40° to 60° C., and after subjecting the thus dyed leather, if necessary, to neutralizing treatment and to fatting treatment by an ordinary method, the fatted leather is washed with water and dried.

On the other hand, in the case of carrying out the rapid dyeing method, the chrome tanned leather is, after being treated by sodium bicarbonate, sodium formate, etc. as neutralization step in accordance with the necessity, dyed in an aqueous dye bath containing the dyestuff having at least one s-triazinyl group to which a substituent group having a quaternary nitrogen atom is bonded via the quaternary nitrogen atom for from 15 to 60 min at a temperature of from 40° to 60° C. Then, the dyed leather is subjected to fatting treatment by an ordinary method, washed with water and dried.

In the case of carrying out the dyeing of the natural leather according to the present invention, the dyestuff defined as above is used in amount of till 10% by weight of the natural leather.

Also on the leather not yet subjected to tanning by chrome salts or the leather tanned by tannin, dyeing can be carried out according to the above-mentioned methods.

In addition, after dyeing, it is favorable to carry out neutralizing the dye bath and then fatting by adding a fatting agent to the dye bath.

In order to obtain a higher grade in alkaline-sweat fastness wet fastness of the dyed leather material, the dyed and fatted leather material may be subjected further to after-treatment by a fastening agent. As the fastening agent, those used for cellulosic fibers can be used and as the concrete instance, polymers of dimethyldiallylammonium chloride, polyethylenepolyamine and the like may be mentioned. Of them, polymers of organic- or inorganic acid salt of diallylamine are preferable. The treatment of the dyed leather by the fastening agent is ordinarily carried out as follows.

The dyed leather which has been subjected to fatting treatment is treated in an aqueous solution containing 0.1 to 50 g/liter, preferably 0.5 to 10 g/liter of a fastening agent for 5 to 20 min at a temperature of from 40° to 60° C., washed with water and dried.

In a method of dyeing natural leathers according to the present invention, by using a reactive dyestuff having at least one S-triazinyl group to which a substituent group having a quaternary nitrogen atom is bonded via the quaternary nitrogen atom the dyed natural leathers which are excellent in fastnesses, particularly in light fastness, alkaline-sweat fastness and wet fastness are obtained. Further, in a method according to the present invention, since any acid-binder, any substance releasing the acid-binder or any inorganic electrolyte is not used, the obtained, dyed natural leathers are excellent in physical properties such as touch, strength and as a result the method according to the present invention has great economic value.

The present invention will be explained more in detail while referring to Examples as follows.

For reference, the carboxyl group and the sulfo group are shown by the free form in Examples.

EXAMPLE 1

Into 20 liters of an aqueous dye bath containing 300 g of the dyestuff represented by the formula (VII):

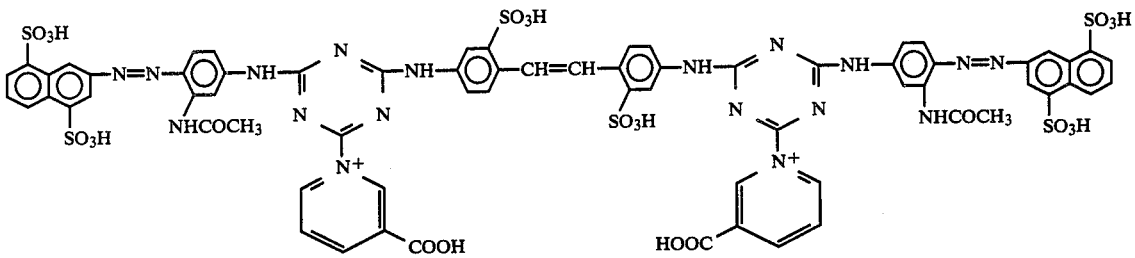

(VII)

10 kg of the pigskin which had been tanned by sodium bichromate and subjected to neutralization treatment were added, and the temperature of the dye bath was raised to 45° C. in the coure of 30 minutes. Dyeing of the pigskin was carried out thus for 45 min at the same temperature, the pH of the dye bath being 5.3 at the finishing of dyeing.

After neutralizing the dye bath by adding a diluted aqueous ammonia, 1 kg of a synthetic fatting agent (made by Hoechst Co., comprising 30 parts by weight of DERMINOLLIQUOR ® EMB, 40 parts by weight of DERMINOLLIQUOR ® MF and 40 parts by weight of DERMINOLLIQUOR ® DF) were added thereto, and after subjecting the dyed pigskin to fatting treatment for 1 hour at 40° C., 100 g of formic acid were added thereto, thereby treating the pigskin for 10 min at 25° C. therein.

By further treating the thus treated pigskin in a separate bath containing 100 g of formic acid at 25° C. for 10 min, washing the pigskin with water and drying thereof, the pigskin dyed in yellow was obtained.

The thus dyed pigskin showed the rating 7 as a result of light fastness test according to Japanese Industrial Standards (JIS) L0842.

On treating the thus dyed pigskin with an aqueous 50% solution of dimethylformamide for 10 min at 95° C., the falling off of the dyestuff was extremely small and alkaline-sweat fastness and wet fastness of the dyed pigskin were extremely favorable. In addition, the color tone of the dyed pigskin was very clear.

Namely, 22 kg of the dyestuff represented by the formula (IX):

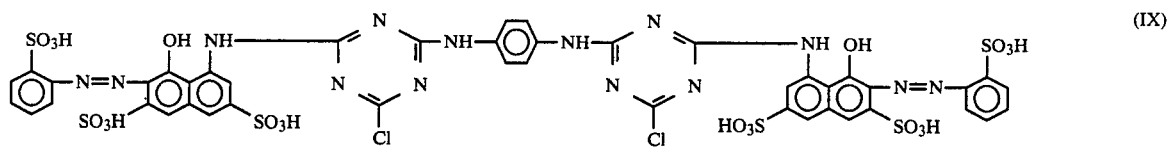

were dissolved in 300 kg of water, and into the thus prepared solution, 70 kg of water containing 2 kg of sodium hydroxide and 6 kg of nicotinic acid were added, and the whole mixture was heated to 80° C. After stirring the mixture for 16 hours at the same temperature, the mixture was subjected to salting out to obtain the dyestuff represented by the formula (VIII).

EXAMPLE 3

Into 25 liters of an aqueous dye bath containing 400 g of the dyestuff represented by the formula (X):

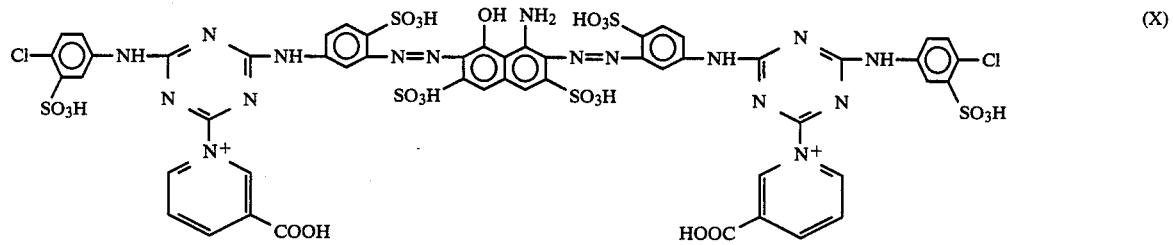

EXAMPLE 2

Into 20 liters of an aqueous dye bath containing 300 g of the dyestuff represented by the formula (VIII):

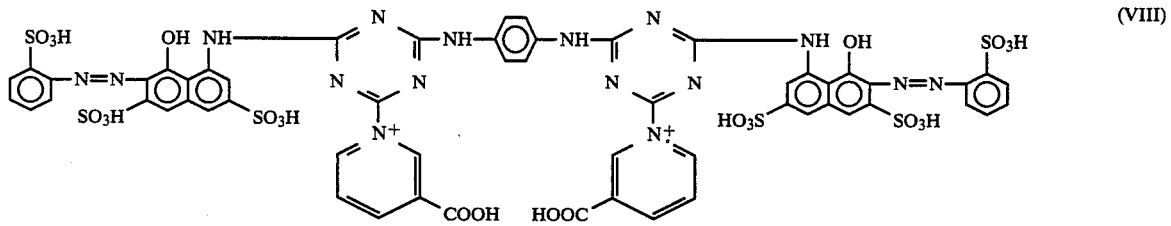

10 kg of sheepskin which had been tanned by chrome salts and subjected to neutralization treatment were introduced, and the sheepskin was dyed therein for 60 min at 40° C. After subjecting the thus dyed sheepskin to the same neutralization treatment, fatting treatment and acid treatment as in Example 1, the thus treated sheepskin was washed with water and dried to obtain a blue sheepskin. The light fastness of the thus obtained, dyed sheepskin was the rating 4 according to JIS L0842. The wet fastness of the dyed sheepskin was extremely favorable. The falling off of the dyestuff from the dyed sheepskin by treating with a 50% aqueous solution of DMF was extremely small, and the color tone of the dyed sheepskin was very clear.

EXAMPLES 4 to 136

Dyeing of pigskin tanned by chrome salts and subjected to neutralization treatment was carried out in the same manner as in Example 1 using each one of the dyestuffs shown in the following tables, and by subjecting the thus dyed pigskin to the fatting treatment and acid treatment, the dyed pigskin of the color shown in the following table was obtained. Every one of the thus obtained, dyed pigskins showed excellent grade in light fastness, alkaline-sweat fastness and wet fastness with a very clear color tone.

10 kg of cowskin which had been tanned by chrome salts and subjected to neutralization treatment were introduced, and the temperature of the dye bath was raised to 50° C. in the course of 35 minutes. Dyeing of the chrome-tanned skin was carried out in the dye bath for 50 min at the same temperature. After neutralizing the dye bath by adding a dilute aqueous ammonia, the same neutralization treatment, fatting treatment and acid treatment as in Example 1 were carried out on the cowskin, and by washing the thus treated cowskin with water and drying the washed cowskin, the cowskin dyed in red was obtained. The thus dyed cowskin showed the rating 5 as a result of light fastness test according to JIS L0842. On treating the thus dyed skin with a 50% aqueous solution of dimethylformamide (DMF), the falling off of the dyestuff was extremely small and the wet fastness of the dyed skin was extremely favorable.

The dyestuff represented by the formula (VIII) used in Example 2 was produced as follows.

| Example No. | Structure | Hue |
|---|---|---|
| 4 | | yellow |
| 5 | | yellow |
| 6 | | yellow |

-continued
| Example No. | Structure | Hue |
|---|---|---|
| 7 | 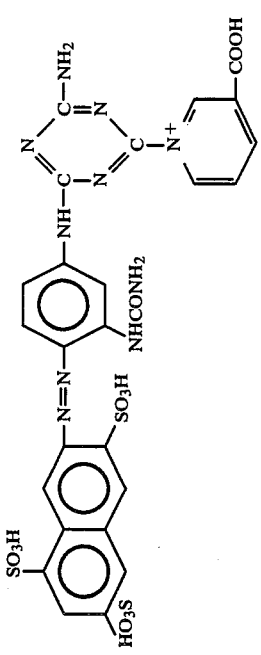 | yellow |
| 8 | 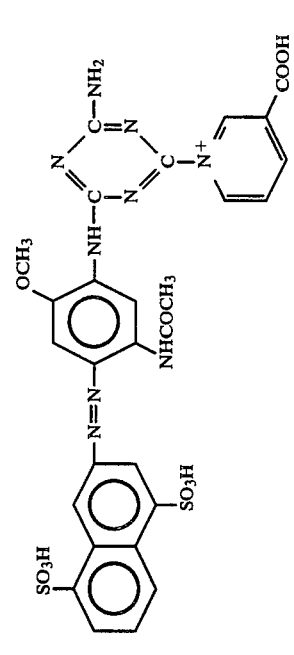 | reddish yellow |
| 9 | 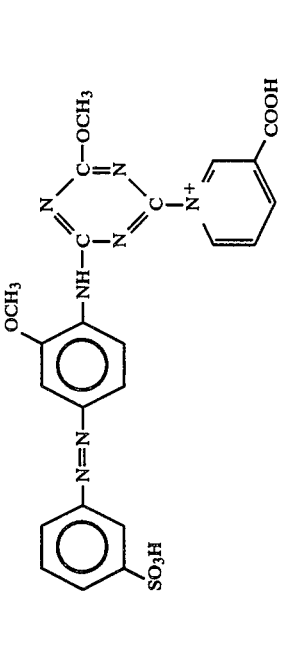 | yellow |

-continued

| Example No. | Structure | Hue |
|---|---|---|
| 10 | (structure) | yellow |
| 11 | (structure) | orange |
| 12 | (structure) | orange |

-continued

| Example No. | Structure | Hue |
|---|---|---|
| 13 | (structure) | scarlet |
| 14 | (structure) | red |
| 15 | (structure) | red |

-continued

| Example No. | Structure | Hue |
|---|---|---|
| 16 | | red |
| 17 | | red |
| 18 | | blue |

-continued

| Example No. | Structure | Hue |
|---|---|---|
| 19 | (anthraquinone dye with NH₂, SO₃H, NH groups linked via triazine bearing NH-C₆H₄-SO₃H and pyridinium-COOH) | blue |
| 20 | (H-acid based disazo dye coupled with 2,5-disulfoaniline and aminophenyl-triazine bearing CONH₂ and 4-carbamoylpyridinium) | blue |

-continued

| Example No. | Structure | Hue |
|---|---|---|
| 21 | (cobalt complex azo structure with SO₃H, Cl, NH, phenyl groups and triazine-pyridinium with COOH) | blue |
| 22 | $Pc\begin{matrix}(SO_3H)_x\\(SO_2NH_2)_y\\(SO_2NHCH_2CH_2NH-)_z\end{matrix}$ linked to triazine-pyridinium-COOH with —OCH₃ substituent<br><br>(wherein Pc represents Cu—phthalocyanine, x, y and z are 0, 1, 2, 3 or 4, respectively and x + y + z = 4) | greenish blue |
| 23 | $Pc\begin{matrix}(SO_3H)_x\\(SO_2NH_2)_y\\(SO_2NH-)_z\end{matrix}$ linked via phenyl-SO₃H to triazine bearing —C—NH— and —C—NH₂, with pyridinium-CONH₂<br><br>(wherein Pc, x, y and z are the same as defined above) | greenish blue |

-continued

| Example No. | Structure | Hue |
|---|---|---|
| 24 | | blue |
| 25 | | brown |
| 26 | | black |

-continued

| Example No. | Structure | Hue |
|---|---|---|
| 27 | | orange |
| 28 | | blue |
| 29 | | yellow |

-continued

| Example No. | Structure | Hue |
|---|---|---|
| 30 | (structure) | yellow |
| 31 | (structure) | yellow |
| 32 | (structure) | reddish yellow |

-continued

| Example No. | Structure | Hue |
|---|---|---|
| 33 | (structure shown) | reddish yellow |
| 34 | (structure shown) | yellow |
| 35 | (structure shown) | yellow |

-continued
| Example No. | Structure | Hue |
|---|---|---|
| 36 | 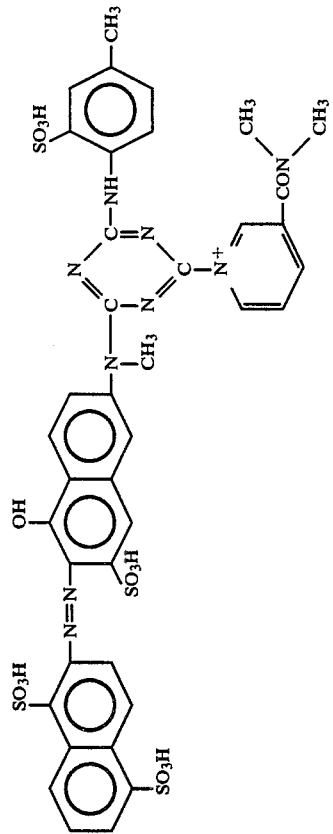 | orange |
| 37 | 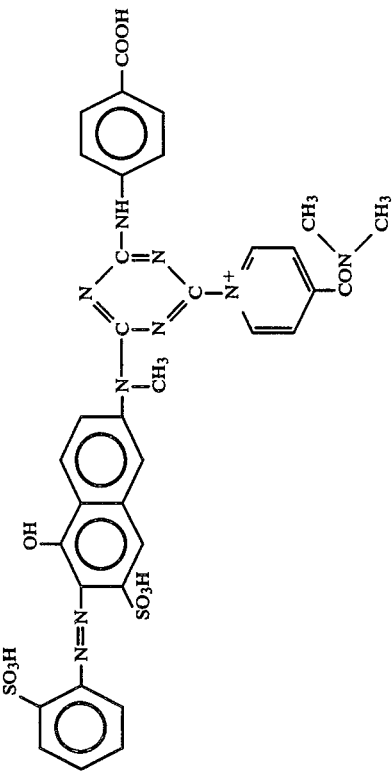 | orange |

-continued
| Example No. | Structure | Hue |
|---|---|---|
| 38 | 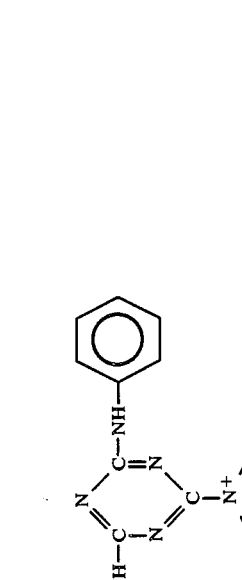 | reddish orange |
| 39 | 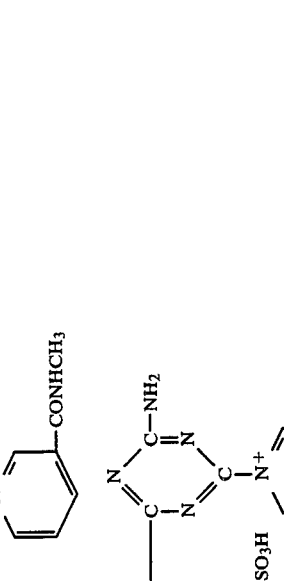 | red |

| Example No. | Structure | Hue |
|---|---|---|
| 40 | 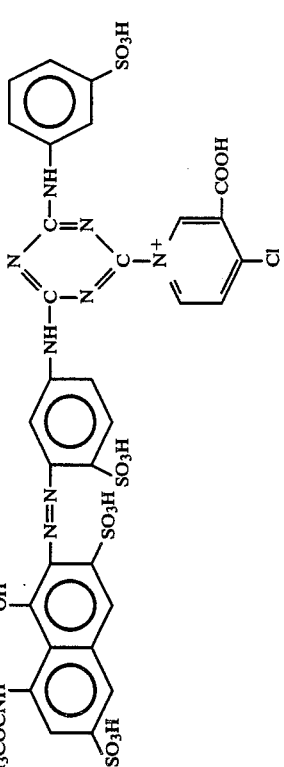 | red |
| 41 | 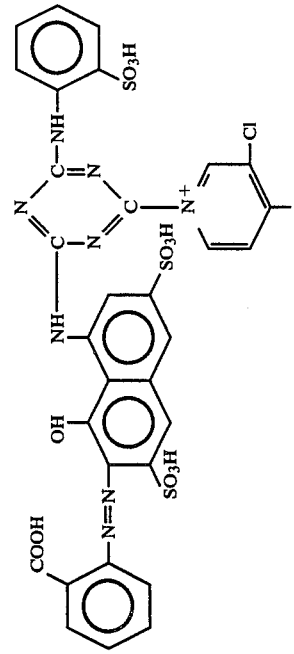 | red |
| 42 | 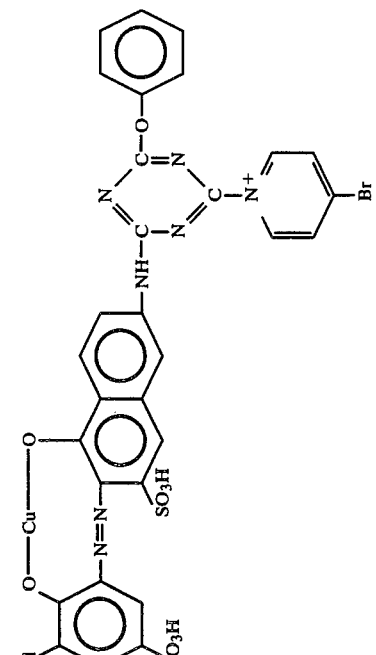 | violet |

-continued
| Example No. | Structure | Hue |
|---|---|---|
| 43 | 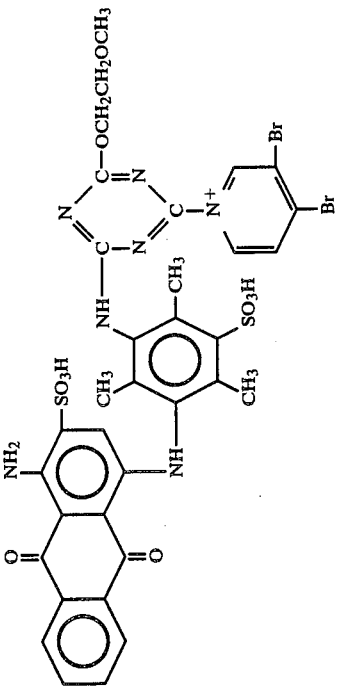 | blue |
| 44 | 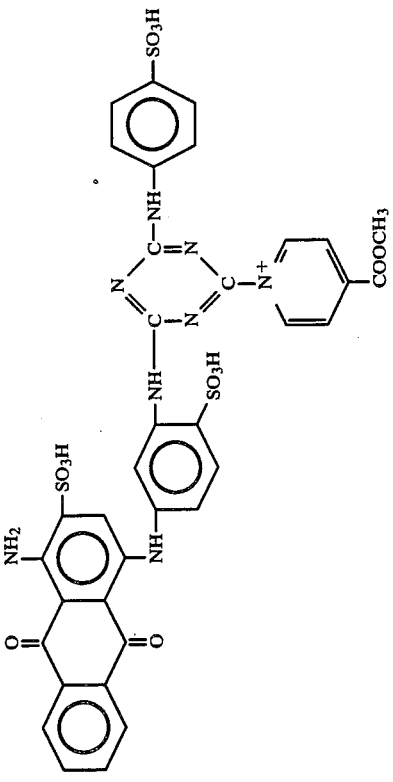 | blue |

-continued

| Example No. | Structure | Hue |
|---|---|---|
| 45 | | navy blue |
| 46 | | blue |
| 47 | | blue |

(wherein Pc, x, y and z are the same as defined above)

-continued
| Example No. | Structure | Hue |
|---|---|---|
| 48 | 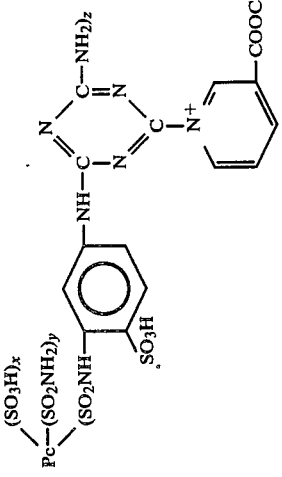 (wherein Pc, x, y and z are the same as defined above) | blue |
| 49 | 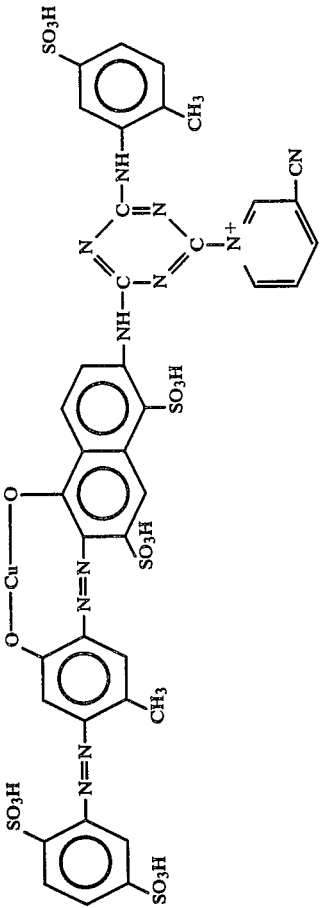 | blue |
| 50 | 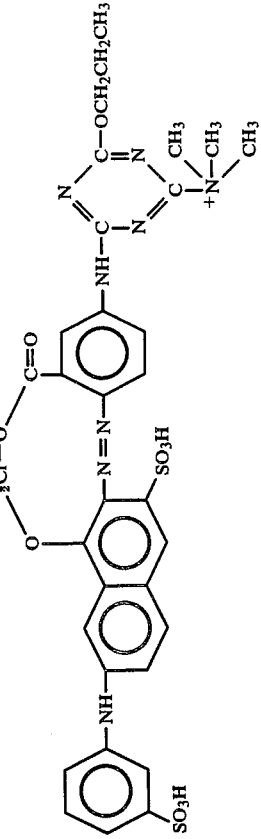 | brown |

-continued

| Example No. | Structure | Hue |
|---|---|---|
| 51 | (structure shown) | black |
| 52 | (structure shown) | yellow |
| 53 | (structure shown) | yellow |

-continued

| Example No. | Structure | Hue |
|---|---|---|
| 54 | | yellow |
| 55 | | yellow |
| 56 | | yellow |

-continued
| Example No. | Structure | Hue |
|---|---|---|
| 57 | | reddish yellow |
| 58 | | yellow |
| 59 | | red |
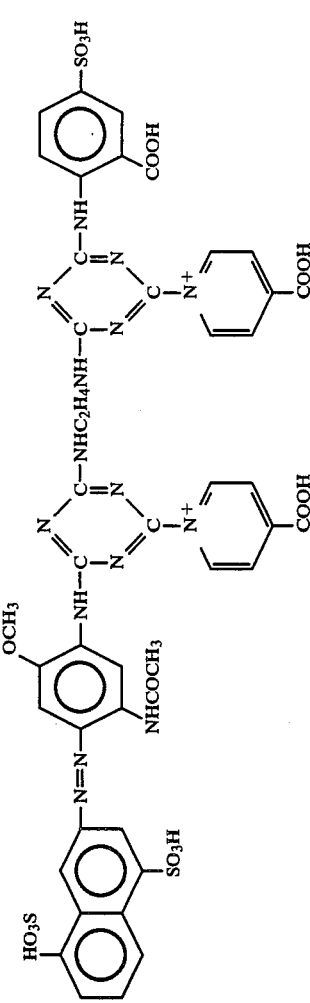

| Example No. | Structure | Hue |
|---|---|---|
| 60 | (chemical structure) | red |
| 61 | (chemical structure) | blue |
| 62 | (chemical structure)<br>(wherein Pc, x, y and z are the same as defined above) | greenish blue |

-continued

| Example No. | Structure | Hue |
|---|---|---|
| 63 | | brown |
| 64 | | brown |
| 65 | | blue |

| Example No. | Structure | Hue |
|---|---|---|
| 66 | 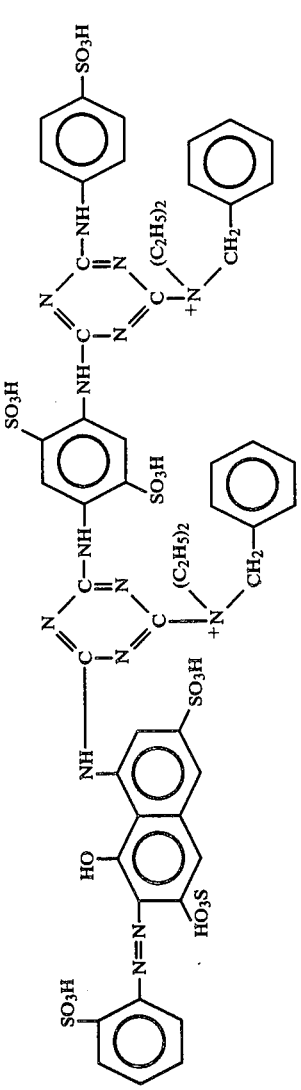 | red |
| 67 | 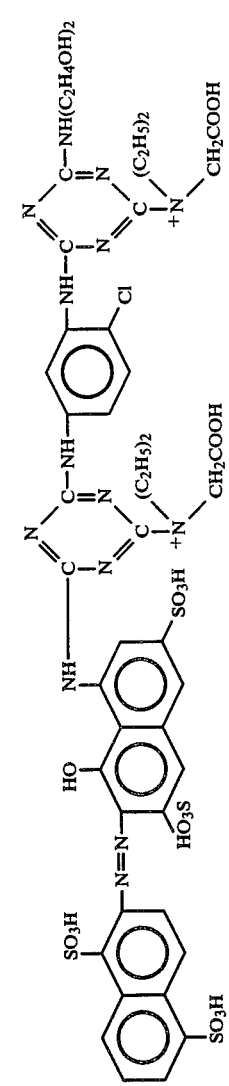 | red |
| 68 | 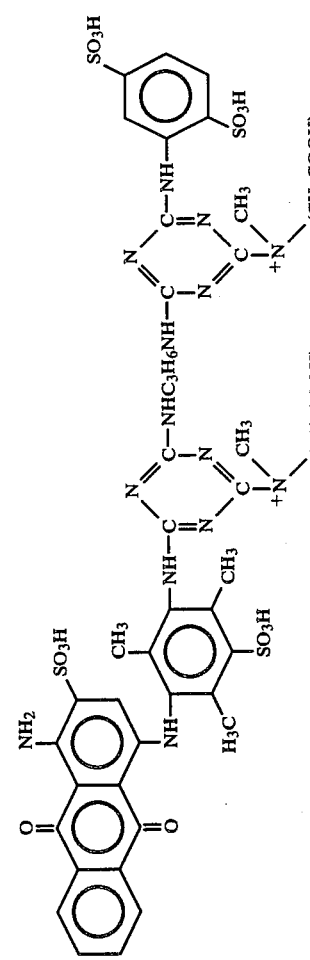 | blue |

-continued

| Example No. | Structure | Hue |
|---|---|---|
| 69 | | blue |
| 70 | | blue |
| 71 | (wherein Pc, x, y and z are the same as defined above) | blue |
| 72 | | yellow |

| Example No. | Structure | Hue |
|---|---|---|
| 73 | | yellow |
| 74 | | reddish yellow |
| 75 | | yellow |
| 76 | | reddish yellow |

-continued
| Example No. | Structure | Hue |
|---|---|---|
| 77 | 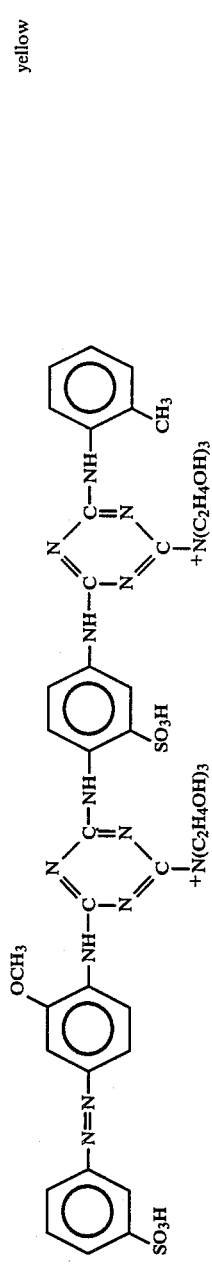 | yellow |
| 78 | 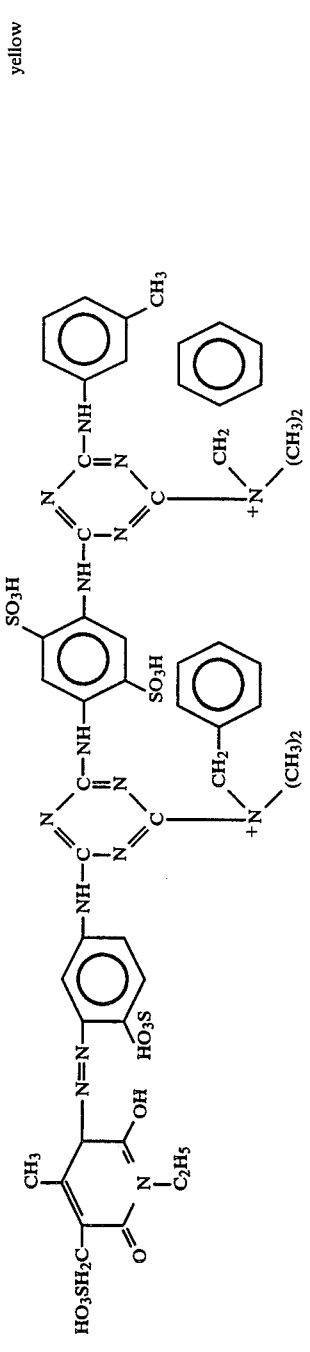 | yellow |
| 79 | 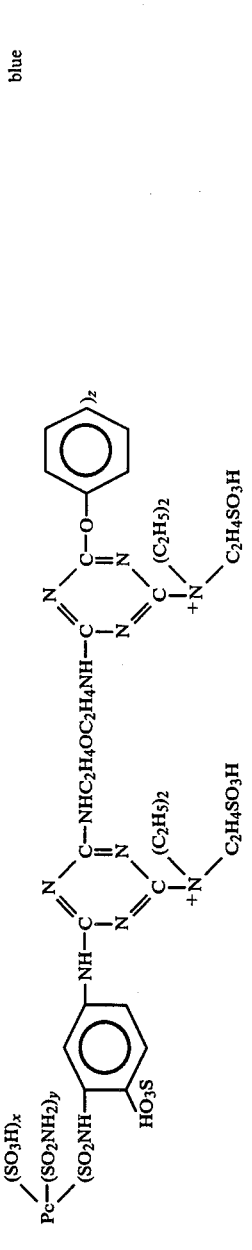 (wherein Pc, x, y and z are the same as defined above) | blue |

-continued

| Example No. | Structure | Hue |
|---|---|---|
| 80 | | brown |
| 81 | | brown |
| 82 | | brown |

-continued

| Example No. | Structure | Hue |
|---|---|---|
| 83 | | black |
| 84 | | blue |

-continued

| Example No. | Structure | Hue |
|---|---|---|
| 85 | | black |
| 86 | | red |
| 87 | | yellow |

-continued

| Example No. | Structure | Hue |
|---|---|---|
| 88 | [structure with naphthalene-azo-benzene sulfonic acid, triazine, pyridinium-COOH, bridged by —NH(CH₂)₆NH—]₂ | orange |
| 89 | [structure with naphthalene-azo-(methoxy-sulfo-phenyl), N-CH₃-triazine, pyridinium-COOH, bridged by —NH-C₆H₄-O-C₆H₄-NH—]₂ | scarlet |

-continued

| Example No. | Structure | Hue |
|---|---|---|
| 90 | ![structure with naphthalene-SO₃H/HO₃S azo phenyl-NHCOCH₃ linked to triazine-pyridinium-COOH, bracketed ×2, with NH-phenyl-SO₃H substituent] | yellow |
| 91 | ![structure with naphthalene-(HO₃S)₂ azo phenyl-NHCONH₂/SO₃H linked to triazine-pyridinium-COOH, bracketed ×2, with NH-phenyl-SO₂-phenyl-NH substituent] | yellow |
| 92 | ![structure with naphthalene-(HO₃S)₂ azo phenyl-SO₃H/NHCONH₂ linked via NH to triazine-pyridinium-COOH, bracketed ×2, with NH-(CH₃)phenyl-NH substituent] | yellow |

-continued

| Example No. | Structure | Hue |
|---|---|---|
| 93 | | red |
| 94 | | red |
| 95 | | yellow |

-continued
| Example No. | Structure | Hue |
|---|---|---|
| 96 | 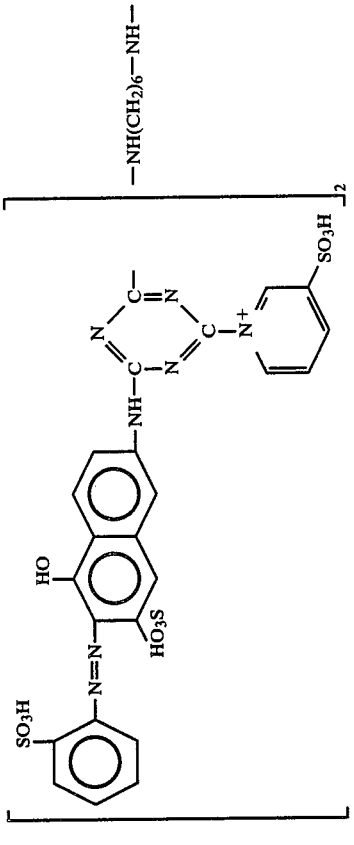 | orange |
| 97 | 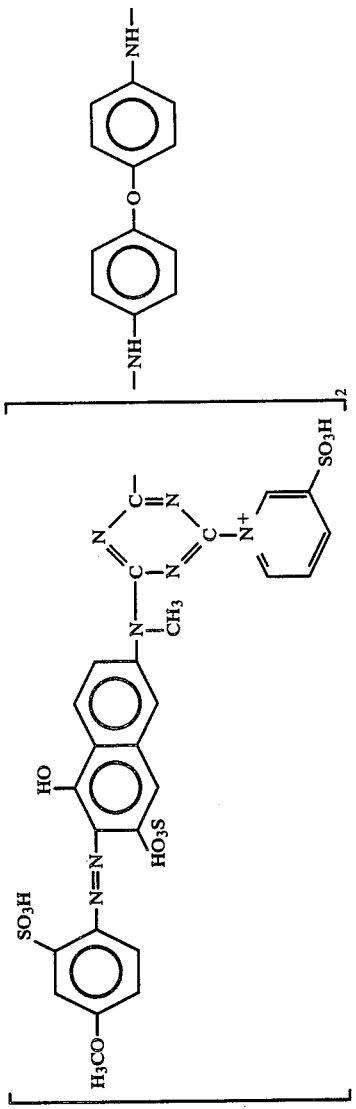 | scarlet |

-continued

| Example No. | Structure | Hue |
|---|---|---|
| 98 | (chemical structure) | yellow |
| 99 | (chemical structure) | yellow |
| 100 | (chemical structure) | yellow |

-continued

| Example No. | Structure | Hue |
|---|---|---|
| 101 | [complex azo dye structure with naphthalene bearing HO$_3$S, SO$_3$H, N=N linkage to phenyl with NHCOCH$_3$ and NH-triazine-pyridinium with CONH$_2$ and CH$_3$, bridged by —NHC$_3$H$_6$NH—]$_2$ | reddish yellow |
| 102 | [complex azo dye structure with naphthalene bearing HO$_3$S, SO$_3$H, N=N linkage to phenyl with NHCONH$_2$ and NH-triazine-pyridinium with CONH$_2$, bridged by —NH—C$_6$H$_4$—NH—]$_2$ | reddish yellow |
| 103 | [complex azo dye structure with naphthalene bearing HO$_3$S, SO$_3$H, N=N linkage to phenyl with NHCONH$_2$ and NH-triazine-pyridinium with COOCH$_3$, bridged by —NH—C$_6$H$_3$(CH$_3$)—NH—]$_2$ | reddish yellow |

-continued
| Example No. | Structure | Hue |
|---|---|---|
| 104 | 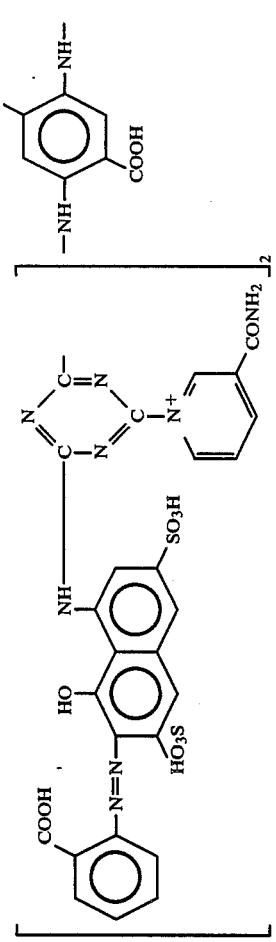 | red |
| 105 | 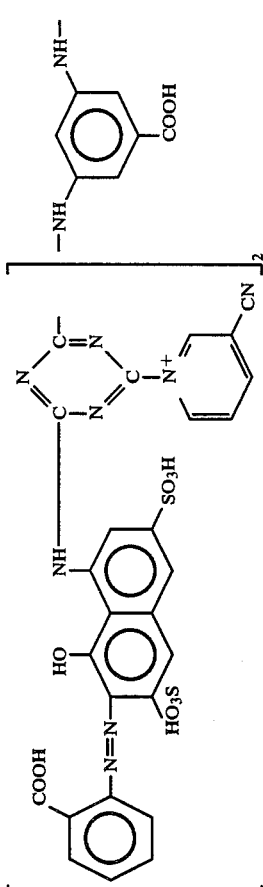 | red |

| Example No. | Structure | Hue |
|---|---|---|
| 106 | 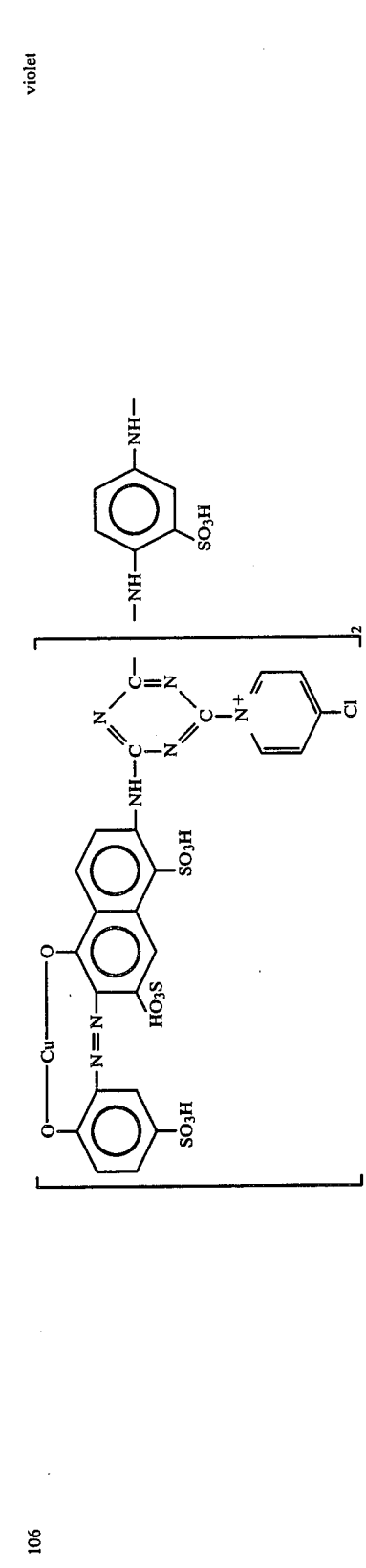 | violet |
| 107 | 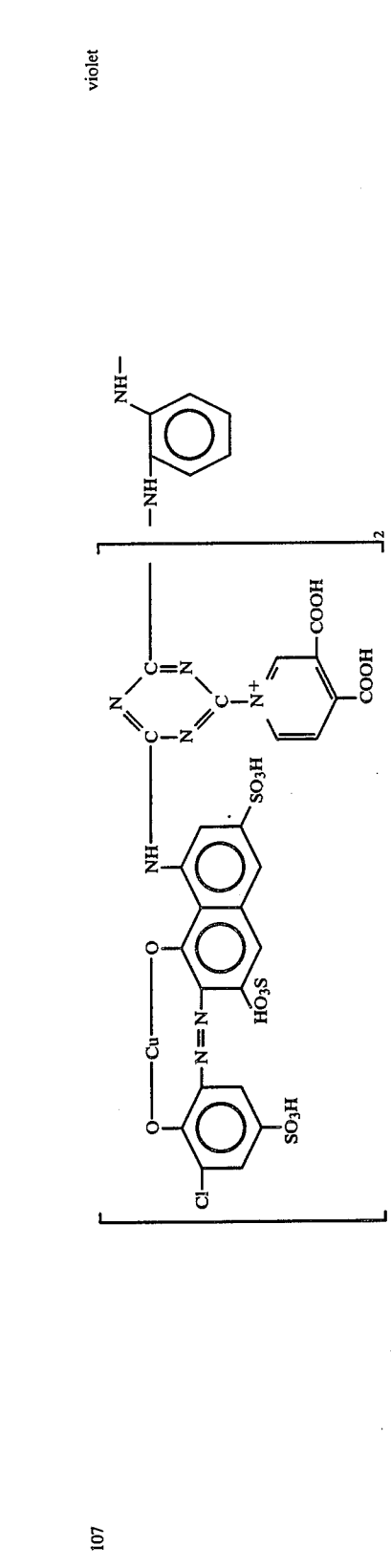 | violet |

-continued
| Example No. | Structure | Hue |
|---|---|---|
| 108 | 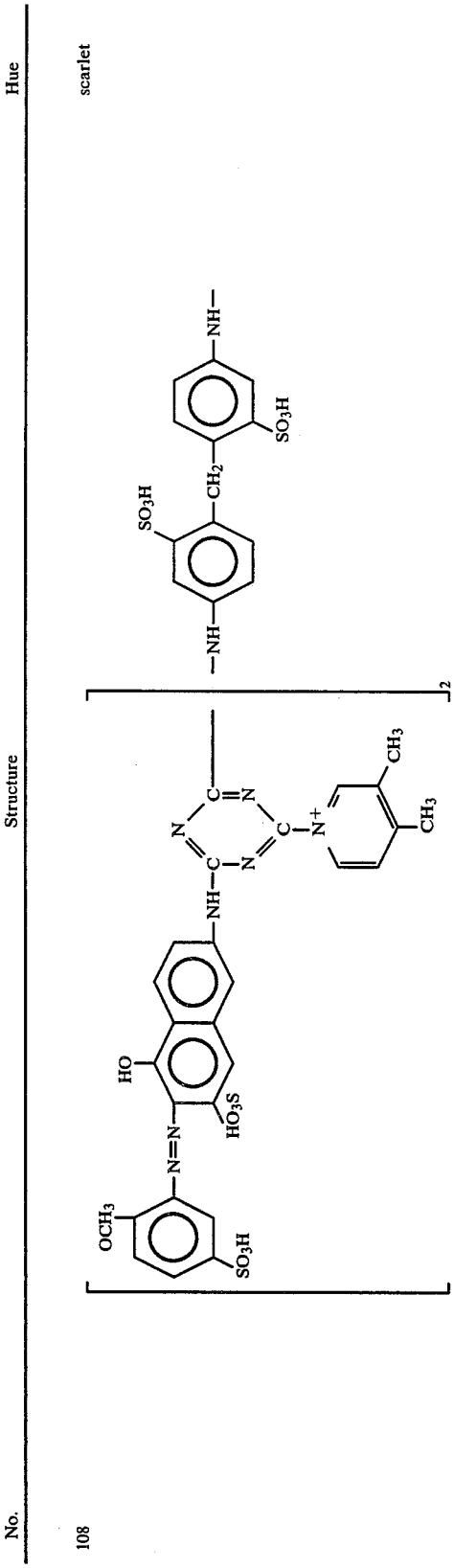 | scarlet |
| 109 | 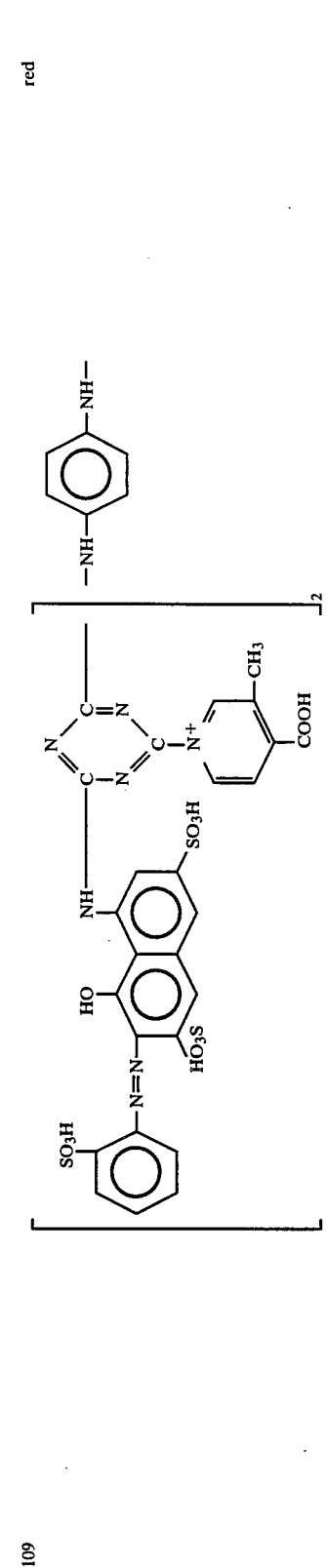 | red |

| Example No. | Structure | Hue |
|---|---|---|
| 110 | 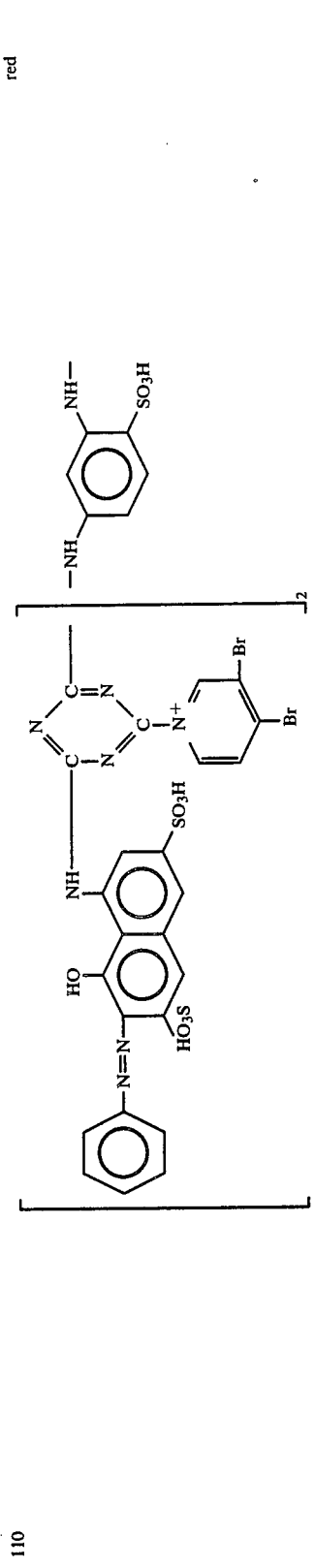 | red |
| 111 | 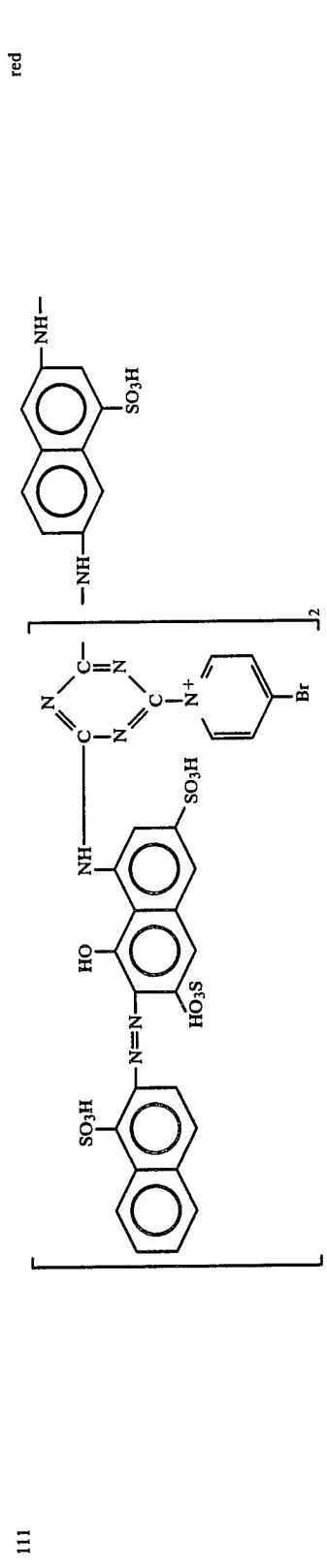 | red |
| 112 | 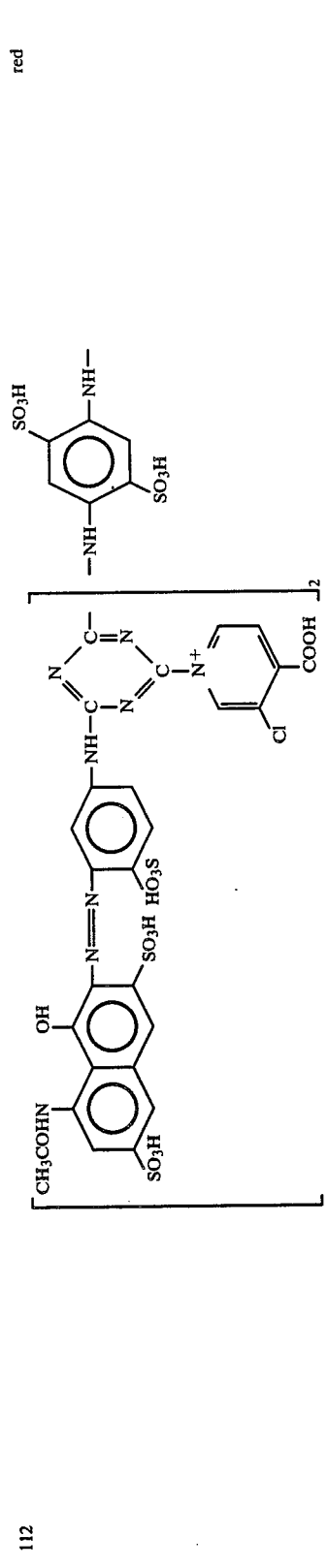 | red |

| Example No. | Structure | Hue |
|---|---|---|
| 113 | (complex azo dye structure with triazine-pyridinium group, bearing OH, H₂N, SO₃H, and sulfonated phenyl substituents, linked to NH–phenyl–NH group, dimer [ ]₂) | blue |
| 114 | (Cu-complexed disazo dye with naphthalene units bearing SO₃H and CONHCH₃ substituents, triazine-pyridinium group, linked to 2,6-dimethyl-NH-phenyl-NH, dimer [ ]₂) | red |
| 115 | (Cu-complexed azo dye with phenyl-SO₃H, phenyl, carboxyl groups, triazine-pyridinium-CONH₂ group, linked to NH–phenyl(SO₃H)₂–NH, dimer [ ]₂) | blue |

-continued

| Example No. | Structure | Hue |
|---|---|---|
| 116 | (chemical structure) | blue |
| 117 | (chemical structure) | yellow |
| 118 | (chemical structure) | red |

-continued

| Example No. | Structure | Hue |
|---|---|---|
| 119 | (structure shown) | navy blue |
| 120 | (structure shown) | greenish blue |
| 121 | (structure shown) | navy blue |

-continued

| Example No. | Structure | Hue |
|---|---|---|
| 122 | | navy blue |
| 123 | | yellow |
| 124 | | red |

| Example No. | Structure | Hue |
|---|---|---|
| 125 | 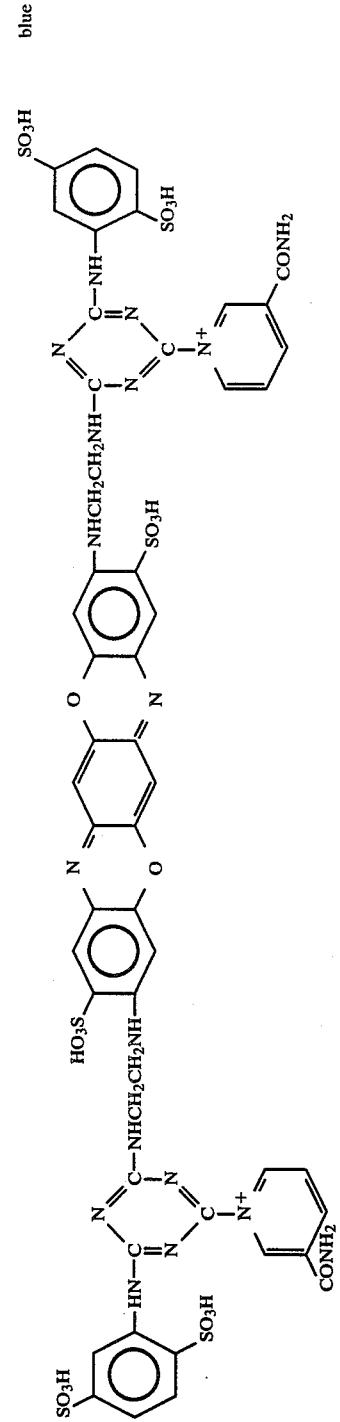 | blue |
| 126 | 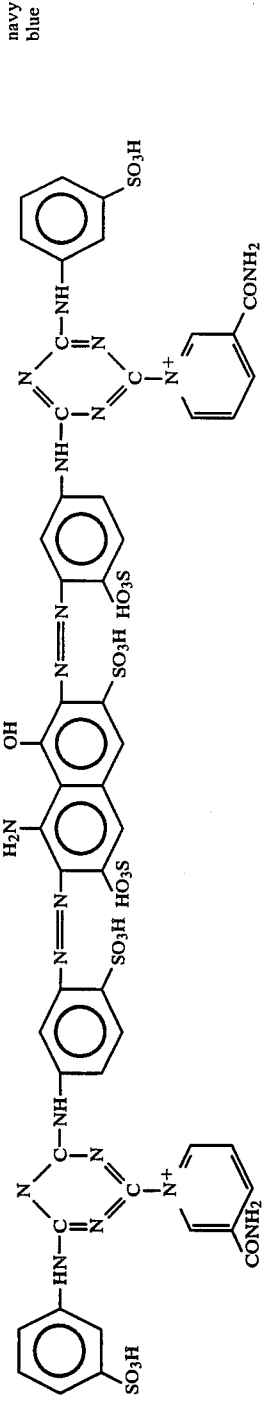 | navy blue |
| 127 | 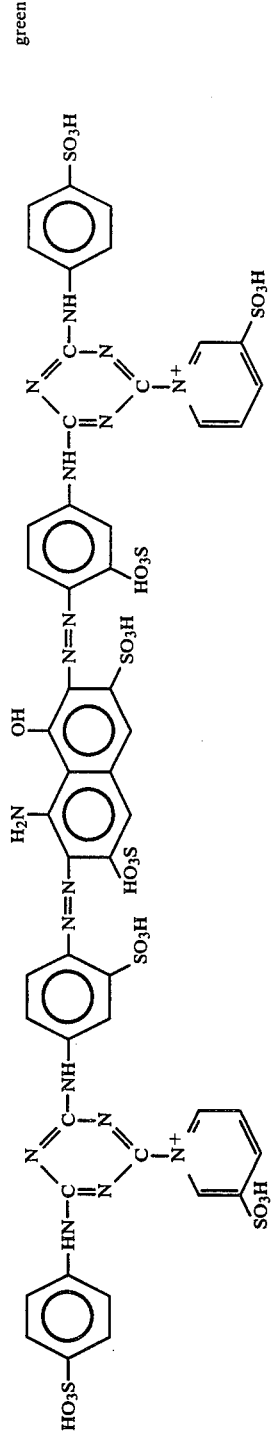 | green |

-continued

| Example No. | Structure | Hue |
|---|---|---|
| 128 | | navy blue |
| 129 | | navy blue |
| 130 | | navy blue |

-continued
| Example No. | Structure | Hue |
|---|---|---|
| 131 | 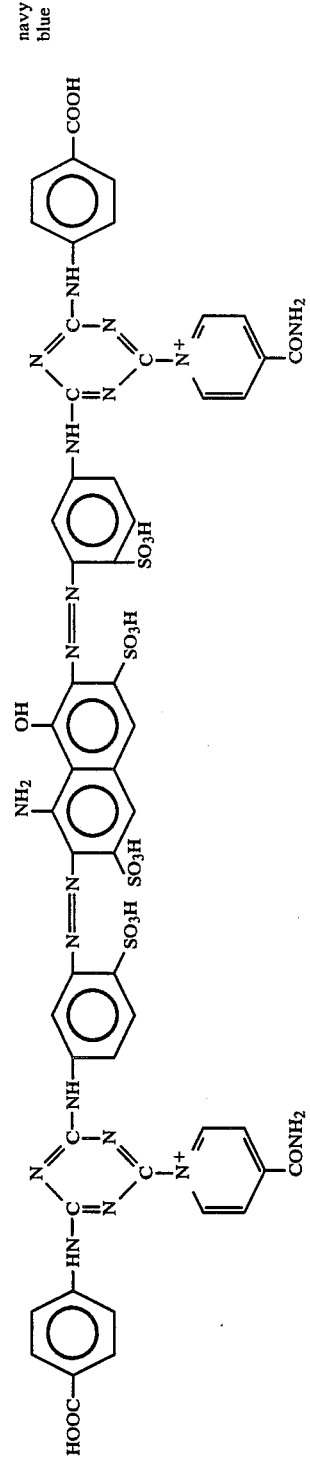 | navy blue |
| 132 | 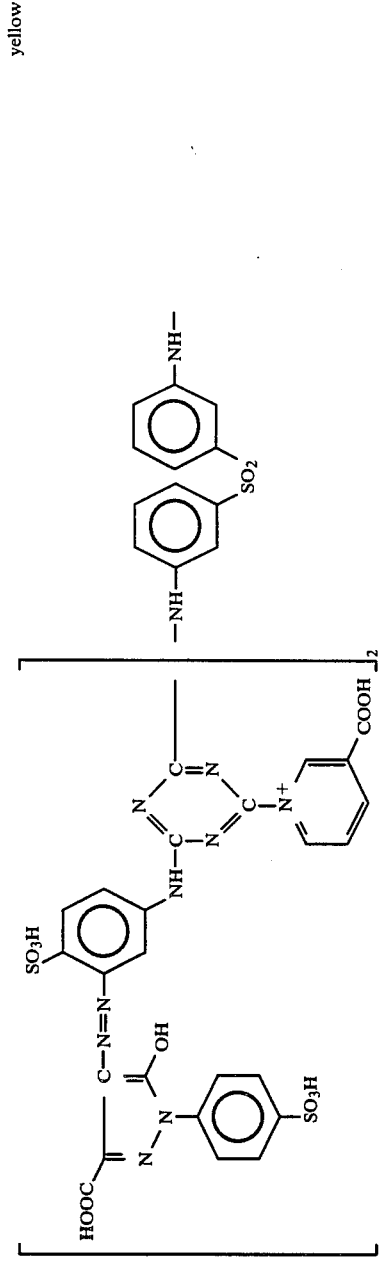 | yellow |

-continued
| Example No. | Structure | Hue |
|---|---|---|
| 133 | 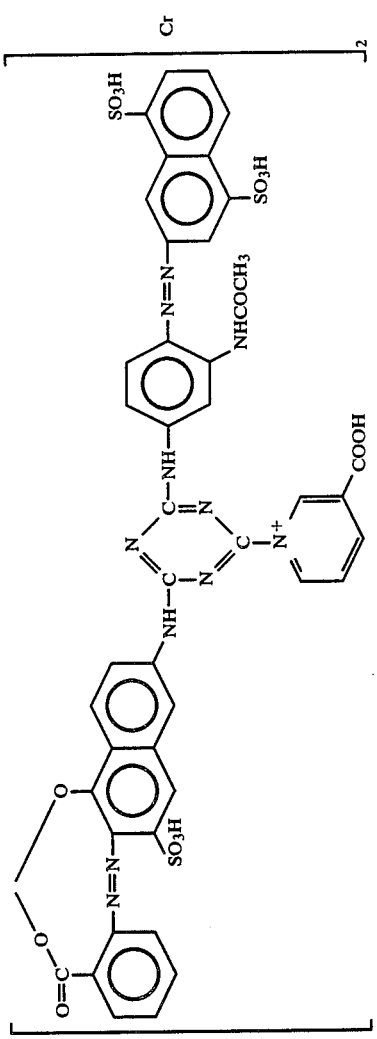 | yellow |
| 134 | 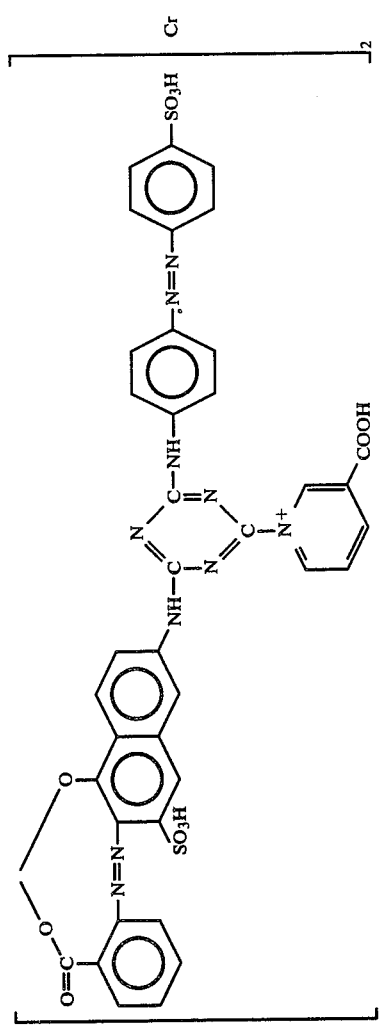 | brown |

-continued
| Example No. | Structure | Hue |
|---|---|---|
| 135 | 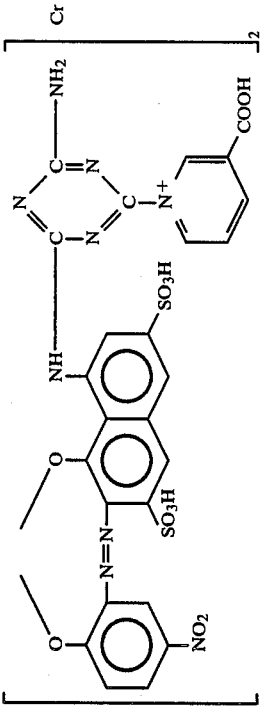 Cr complex, ratio 2 | black |
| 136 | 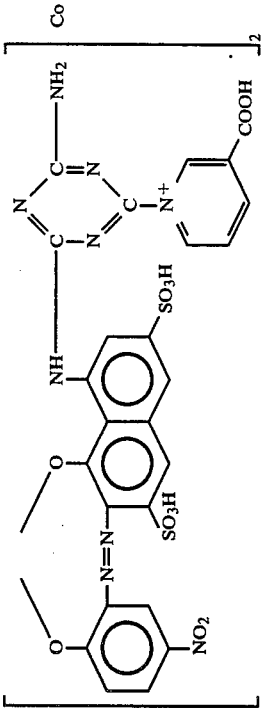 Co complex, ratio 2 | black |

EXAMPLE 137

In the process of Example 1, after treating the dyed pigskin with formic acid, the pigskin was subjected to an after-treatment in a bath prepared by dissolving 100 g of a polymer of hydrochloric acid salt of diallylamine (average molecular weight of about 3,000) in 30 liters of warm water at 40° C. for 10 min and dried to obtain an after-treated yellow pigskin.

The thus obtained pigskin showed the rating 7 as a result of light fastness test according to JIS L0842.

As a result of alkaline sweat fastness test according to JIS L0848, no color-change of the dyed pigskin was observed, and the dyed pigskin did not stain cotton and wool.

What is claimed is:

1. A method for dyeing natural leather by an exhaustion of a reactive dyestuff represented by the formulae (III) to (VI):

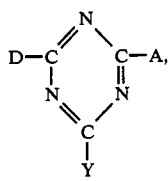  (III)

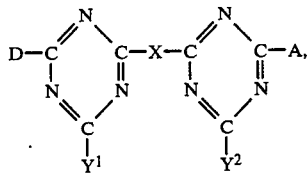  (IV)

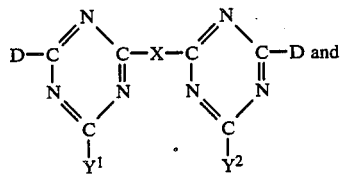  (V)

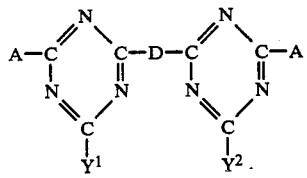  (VI)

wherein Y represents a group

$Y^1$ and $Y^2$ are a group

or one of $Y^1$ and $Y^2$ is a group

and the other represents a chlorine atom, a fluorine atom or a bromine atom; D represents a chromophore having at least one water-soluble group, and D is bonded to the triazinyl group via a group

wherein R is a hydrogen atom or an alkyl ($C_1 \sim C_3$) group; A represents an unsubstituted or substituted amino group, an alkoxy ($C_1 \sim C_4$) group or a phenoxy group which does not react with the chromophore; and X represents a diamino residual group bonded to the triazinyl group via two amino groups.

2. A method according to claim 1, wherein Y and at least one of $Y^1$ and $Y^2$ represent a quaternary pyridinium group represented by the formula:

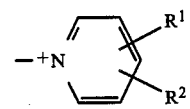

wherein $R^1$ and $R^2$ represent independently a hydrogen atom, a chlorine atom, a bromine atom, a methyl group, a sulfo group, a carboxyl group, a carbamoyl group, a lower alkoxy ($C_1 \sim C_4$) carbonyl group and a cyano group, or a quaternary ammonium group represented by the formula:

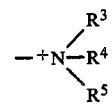

wherein $R^3$, $R^4$ and $R^5$ independently represent an alkyl ($C_1 \sim C_4$) group, a hydroxyalkyl ($C_1 \sim C_4$) group, a benzyl group, a sulfoalkyl ($C_1 \sim C_4$) group, a carboxyalkyl ($C_1 \sim C_4$) group and an alkoxy ($C_1 \sim C_4$) alkyl ($C_1 \sim C_4$) group; D represents a chromophore of non-metal containing azo dyestuffs, metal-containing azo dyestuffs, formazane dyestuffs, phlhalocyanine dyestuffs or anthraquinone dyestuffs; A represents an amino group, an alkyl ($C_1 \sim C_4$) amino group, a hydroxyalkyl ($C_1 \sim C_4$) amino group, a cyanoalkyl ($C_1 \sim C_4$) amino group, a β-sulfoethylamino group, —NHC$_2$H$_4$SO$_3$H, —NHCH$_2$COOH, an anilino group, anilino groups substituted by a chlorine atom, a sulfo group, an alkyl ($C_1 \sim C_4$) group, an alkoxy ($C_1 \sim C_4$) group, a nitro group or a carboxyl group, an N-methylanilino group, an N-ethyl-4-chloroanilino group, an alkoxy ($C_1 \sim C_4$) groups, an alkoxy ($C_1 \sim C_4$) alkoxy ($C_1 \sim C_4$) groups, a phenoxy group, phenoxy groups substituted by a chlorine atom, a nitro group, a methyl group, a sulfo group or a carboxyl group, a morpholino group, a piperidino group or a piperadino group; X represents an alkylenediamino group or an arylenediamino group.

3. A method according to claim 2, wherein Y and one of $Y^1$ and $Y^2$ represent

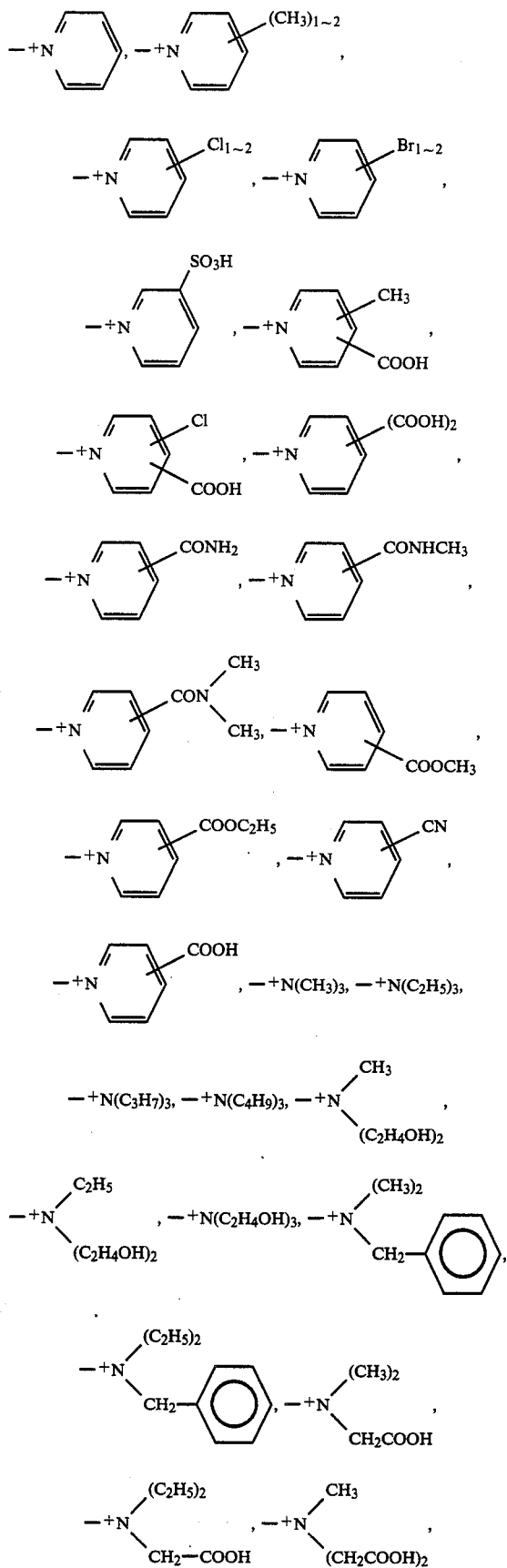

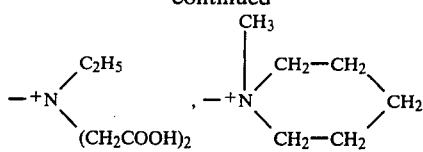

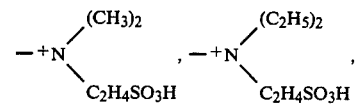

−⁺N(C₂H₄OCH₂)₃, −⁺N(C₂H₄OC₂H₅)₃ or

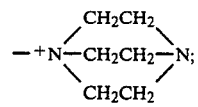

A represents an amino group, a methylamino group, an ethylamino group, a propylamino group, a butylamino group, a dimethylamino group, a diethylamino group, an N-methyl, N-ethyl amino, an octylamino group, a cyclohexylamino group, a monoethanolamino group, a diethanolamino group, a β-cyanoethylamino group, a di-β-cyanoethylamino group, a β-sulfoethylamino group, —NHC₂H₄SO₃H, —NHCH₂COOH, an anilino group, o-, m- or p-sulfoanilino group, 2,5-disulfoanilino group, o-, m- or p-toluidino group, o-, m- or p-methoxyanilino group, o-, m- or p-chloroanilino group, 2-methyl-4-sulfoanilino group, 2-methoxy-4-sulfoanilino group, p-nitroanilino group, 2-sulfo-4-methylanilino group, 4-chloro-2-sulfoanilino group, o-, m- or p-carboxyanilino group, 2-carboxy-4-sulfoanilino group, an N-methylanilino group, an N-ethyl-4-chloroanilino group, a methoxy group, an ethoxy group, a propoxy group, a butoxy group, a methoxyethoxy group, an ethoxyethoxy group, a methoxypropoxy group, a phenoxy group, o-, m- or p-chlorophenoxy group, o-, m- or p-nitrophenoxy group, o-, m- or p-sulfophenoxy group, o-, m- or p-carboxyphenoxy group, a morpholino group, a piperidino group or a piperadino group; X represents an ethylenediamino group, a 1,3-propylenediamino group, a 1,6-hexylenediamino group, a 2-hydroxy-1,3-propylenediamino group, —NHCH₂CH₂OCH₂CH₂NH—, a 1,4-phenylenediamino group, a 1-methyl-2,6-phenylenediamino group, a 1,3-phenylenediamino group, a 4-sulfo-1,3-phenylenediamino group, a 4,6-disulfo-1,3-phenylenediamino group, a 2-sulfo-1,4-phenylenediamino group, a 2,5-disulfo-1,4-phenylenediamino group, a 5-carboxyl-1,3-phenylenediamino group, a 2,5-dimethoxy-1,4-phenylenediamino group, a 1-N-methylaminoanilino group, a 1,2-phenylenediamino group, a 2,4,6-trimethyl-5-sulfo-1,4-phenylenediamino group,

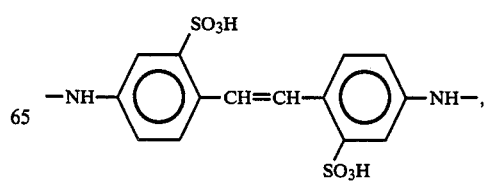

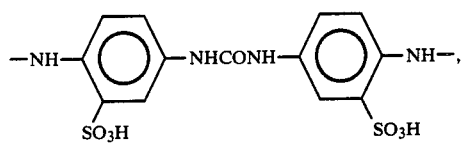
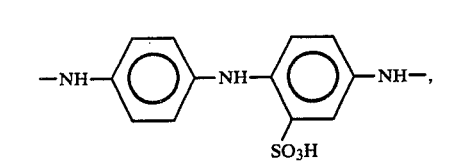
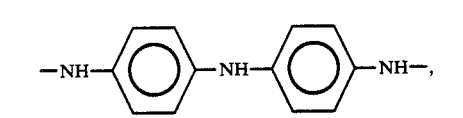
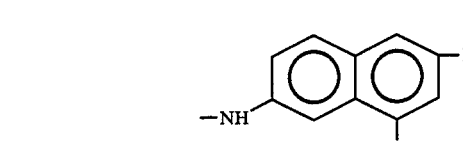
a 2-methyl-5-sulfo-1,3-phenylenediamino group, 4-methyl-1,2-phenylenediamino group,
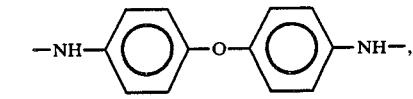
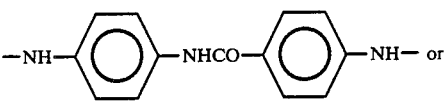 or
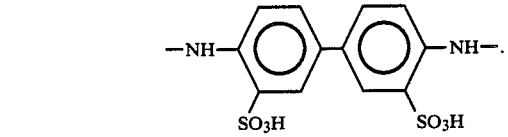
* * * * *